United States Patent
Cortiñas et al.

(10) Patent No.: US 7,341,021 B2
(45) Date of Patent: Mar. 11, 2008

(54) SUBMERSIBLE FARM

(76) Inventors: Andres Quinta Cortiñas, Campaña, Apartado 51, E-36645 Valga, Pontevedra (ES); Eladio Diaz Arbones, Campaña, Apartado 51, E-36645 Valga, Pontevedra (ES)

(*) Notice: Subject to any disclaimer, the term of this patent is extended or adjusted under 35 U.S.C. 154(b) by 0 days.

(21) Appl. No.: 10/519,165

(22) PCT Filed: Jun. 26, 2003

(86) PCT No.: PCT/ES03/00316

§ 371 (c)(1), (2), (4) Date: Feb. 9, 2005

(87) PCT Pub. No.: WO2004/002220

PCT Pub. Date: Jan. 8, 2004

(65) Prior Publication Data

US 2006/0037551 A1    Feb. 23, 2006

(30) Foreign Application Priority Data

Jun. 28, 2002  (ES) ............................. 200201501

(51) Int. Cl.
*A01K 61/00* (2006.01)
(52) U.S. Cl. ....................... 119/239; 119/234
(58) Field of Classification Search ............... 119/234, 119/238–241
See application file for complete search history.

(56) References Cited

U.S. PATENT DOCUMENTS

| | | | | | |
|---|---|---|---|---|---|
| 4,257,350 | A | * | 3/1981 | Streichenberger | 119/223 |
| 4,766,846 | A | * | 8/1988 | Lavoie | 119/240 |
| 5,412,903 | A | * | 5/1995 | Zemach et al. | 43/102 |
| 5,653,193 | A | * | 8/1997 | Marissal | 119/240 |
| 6,431,107 | B1 | * | 8/2002 | Byle | 114/264 |

FOREIGN PATENT DOCUMENTS

| | | | |
|---|---|---|---|
| EP | 137087 A1 | * | 4/1985 |
| FR | 2562385 A1 | * | 10/1985 |
| FR | 2562386 A1 | * | 10/1985 |
| JP | 2005110612 A | * | 4/2005 |

* cited by examiner

*Primary Examiner*—Kimberly S. Smith
(74) *Attorney, Agent, or Firm*—Breiner & Breiner, L.L.C.

(57) ABSTRACT

An improved submersible mollusc farm is disclosed. A line of cables bearing the culture ropes and the cylindrical buoys which maintain the line horizontal is suspended from end floats. The end floats include a filling/emptying system using water by way of ballast, in order to raise or submerge the line by inflating the end floats with air. Submerged tension buoys are connected to the end floats by tension cables and pulleys which are fixed to the dead weights provided at either end of the line. The vertical thrust of the tension buoys causes the pulley to stretch the cable and tauten the line.

2 Claims, 1 Drawing Sheet

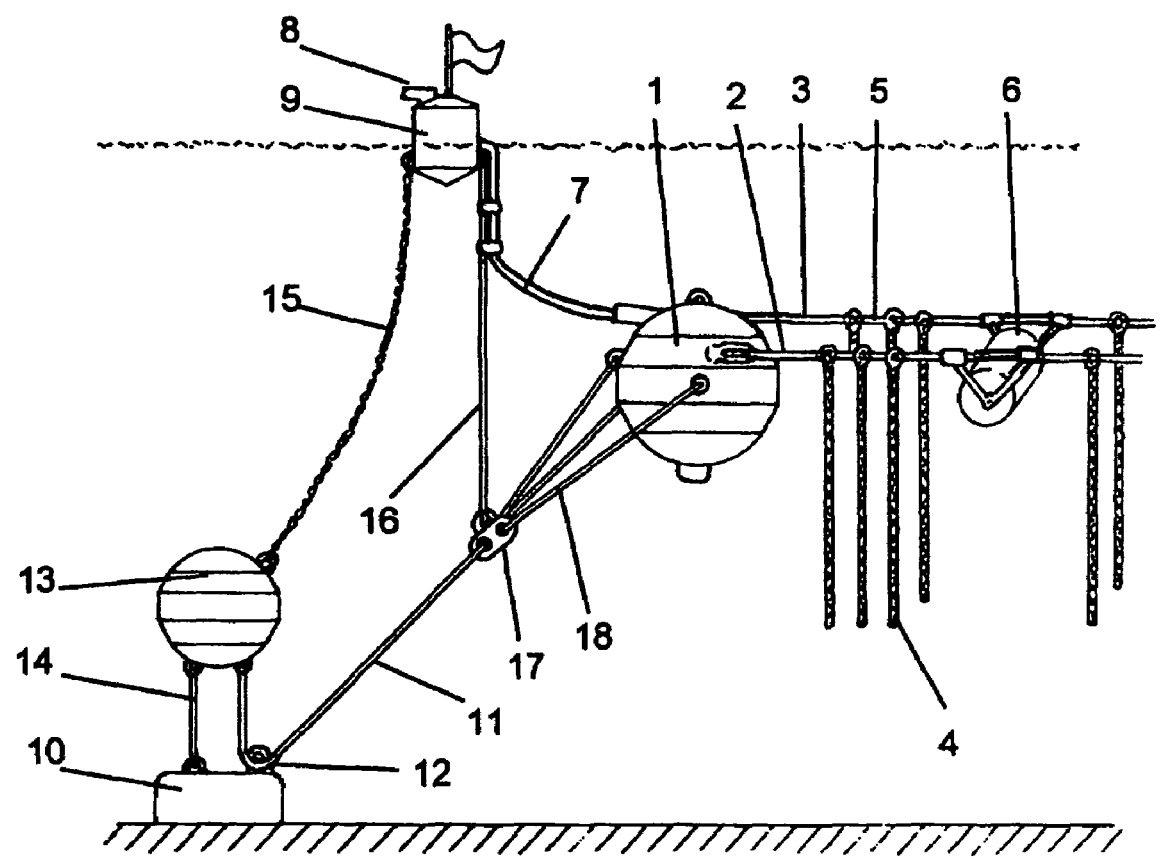

SUBMERSIBLE FARM

FIELD OF INVENTION

This invention relates to an improved submersible shellfish farm including at least one line of cables bearing ropes to which the shellfish are attached for their rearing. The line is suspended horizontally from two end floats which support the line in association with intermediate support buoys and is anchored by dead weights positioned at each end of the line.

BACKGROUND OF INVENTION

In the traditional shellfish breeding methods requiring shallow seabeds in quiet waters, matter is produced, which, in high concentrations, perturbs and offsets the balance of the surrounding ecosystem. This environmental pollution has a negative effect on the ecological balance by causing a decrease in the plankton flow and a drop of the feeding rate of the shellfish, with a consequent reduction of the desired production of cultures.

Other self-supported installations are also constructed for breeding shellfish, such as that disclosed in the document ES 1043285U by Carceller, which describes a live well improved for growing mussels in open sea, comprising a rope or longline from which the breeding ropes are hanging and which is maintained in a horizontal position once extended and grounded by means of weights anchored on the sea floor, while subjected to the uplift force exerted by a plurality of buoys or floats to which it is attached in combination with a plurality of surface floats, the live well is provided with an improved support and beaconing facility.

These already existing installations, in particular those with self-supporting flotation buoys, have proven their open sea capabilities but have the drawback that the impact of the waves and the weight of the load during vertical movement can not only cause the detachment of the animals due to rupture of the supporting byssus, but can also result in exhausting or stressful situations for some breeding species.

Although these open sea installations allow mooring the ship to the longline to facilitate collection of the harvest, no description is available in respect to the handling of the longline which we suppose is raised by crane, normally a difficult procedure.

A further negative effect on the crop is caused by the necessary maintenance of the line at a height normally equidistant to the seabed, this being established depending on both the length of the chains used to connect the ends of the longline to the dead weights holding the chains to the sea floor as well as the upwards lift from the floaters.

OBJECTS AND SUMMARY OF INVENTION

It is one aim of the present invention to enable the breeding of shellfish in open sea and to provide suitable conditions for adapting to the swell, the tide and even the possible maritime traffic. A further aim is to avoid the occurrence of those sudden vertical movements, which traditional farms suffer from and which cause the detachment or exhaustion of the animals. In addition, the farm is designed in such a way that the collection or laboring of the crop can take place with no manual intervention.

The above-mentioned aims are achieved in the improved submersible farm according to the present invention by suspending the line of cables and the cylindrical buoys that maintain the line horizontally from the end floats which comprise a filling/draining system using water by way of ballast, in order to lift or submerge the line by inflating the floats with air. Further, the present invention relates to an anchoring system using submerged tension buoys that are connected to the aforementioned floats by means of tension cables and pulleys which are fixed to the dead weights provided at either end of the line. The vertical thrust of the above-mentioned tension buoys causes the pulley to stretch the cable and tauten the line.

This object is achieved by means of an improved submersible shellfish farm comprising at least one line of cables bearing spaced ropes to which the shellfish are attached for their rearing. The line is suspended horizontally from two end floats which support the line in association with intermediate support buoys and is further anchored by dead weights positioned at each end of the line. An essential characteristic of the aforementioned at least one line of cables is its ability to be submerged and located at any position elevated in relation to the sea floor while guided by the vertical movement of the above-mentioned end floats when they are in a submerged state. The end floats are capable of being submerged or raised as a consequence of their inner volume being variable by filling or draining the volume of water or air. The end floats are connected to a surface buoy comprising an air intake valve and are also connected to the aforementioned concrete dead weights by an anchoring system which maintains the line tension.

A further essential characteristic is that the anchoring system comprises at least the respective end buoys conveniently submerged and arranged so as to use their uplift thrust to pull at each of the end floats to which they are respectively connected by means of tensioning cables and pulleys fixed to the concrete dead weights.

The end floats from which the line of cables bearing the culture ropes is suspended and the cylindrical buoys that maintain the line horizontally comprise a filling/draining system using water by way of ballast in order to lift or submerge the line by inflating the floats with air. Submerged tension buoys, connected to the floats by means of tension cables and pulleys which are fixed to the dead weights provided at either end of the line, create a vertical thrust which causes the pulley to stretch the cable and tauten the line.

BRIEF DESCRIPTION OF THE DRAWING

The sole FIGURE shown in the illustration sheet shows a perspective view of an improved submersible farm in accordance with the present invention.

DETAILED DESCRIPTION OF THE PREFERRED EMBODIMENTS

The present invention relates to an improved submerged farm comprising a line formed by at least two parallel cables and suspended between two end floats which act as a support for the line. The end floats are supplied with air through a pneumatic hose connected to an air intake valve which is mounted on a surface buoy. The described assembly is anchored by means of dead weights located at each end of the line and in close proximity to the aforementioned end floats respectively, to which two submerged tension buoys are attached by means of a cable and a pulley fixed to the dead weight. The tension buoys create a vertical thrust which causes the stretching of the cable and tautening of the line.

According to the present invention, the culture ropes are suspended from each of the cables forming the line of cables in such a way that spaces are left between each of the ropes and occupying each of the spaces and suspended between both parallel cables, cylindrical buoys are suspended to ensure that the submerged line of cables is maintained in a horizontal position, while avoiding the creation of a catenary. In the same manner as the end floats, these buoys are supplied with the air circulating through the pneumatic hose in such a way that pressurized air can be injected into the buoys to remove the ballast water or, alternatively, leaving the air to escape to enable the inflow of water into them. This method enables the adjustment of the depth at which the line is to be maintained or the raising of the line to the surface for collection or laboring.

The cylindrical buoys are advantageously mounted underneath of the cables so that they raise the line until the grips of the culture ropes are left outside the water.

According to a preferred embodiment of the present invention, the farm includes a line of cables bearing culture ropes and being suspended between two end floats, which are anchored to respective concrete dead weights. Preferably, each end float, or at least one of the two, is connected to a surface beacon buoy fitted with a system to supply pressurized or atmospheric air to the end floats. The system includes at least one air intake valve and one pneumatic hose.

The farm is advantageously anchored by means of dead weights located at each end of the line and in close proximity to the aforementioned end floats respectively, to which two submerged tension buoys are attached by means of a cable and a pulley fixed to the dead weight. The tension buoys create a vertical thrust which causes the stretching of the cable and tautening of the line.

The culture ropes are conveniently suspended from each of the cables in the line in such a way that cylindrical buoys are suspended between both parallel cables, occupying the spaces between the ropes and ensuring that the submerged line of cables is maintained in a horizontal position, while avoiding the creation of a catenary. In the same manner as the end floats, these buoys are supplied with the air circulating through the pneumatic hose in such a way that pressurized air can be injected into the buoys to remove the ballast water or, alternatively, leaving the air to escape to enable the inflow of water into them. This method enables the adjustment of the depth at which the line is to be maintained or the raising of the line to the surface for collection or laboring.

The culture ropes are normally suspended along each of the cables in the line, maintaining a distance of one and a half meters between them and held in that position by suitable stops. Preferably, every five meters of the line, buoys are positioned underneath of the cables to join them and to maintain the line in a substantially horizontal position.

According to the example, the culture ropes incorporate a hoop with a handle, a gravity actuated snaphook and a ring to which the aforementioned culture rope is fastened.

The selection of the anchoring system will depend on the location where the farm is installed. By way of example, a preferred embodiment appropriate for locations with low tide is realized by placing at each end of the line of cables a submerged buoy anchored to a dead weight with a line, and which function it is to maintain the line tension by means of a pulley mounted on the concrete dead weight. A chain joins the submerged buoy and the surface buoy while providing a means of anchoring for the buoy. A cable holding the hose connects the beacon buoy with a linking element, which joins the tensioning cable from the anchor buoy and a set of hinged bars that have the function of preventing the main buoys from capsizing.

Notwithstanding the above example, in a second embodiment suitable for locations with high tide, the anchoring system could comprise level buoys secured on the end floats of the farm line in combination with the tensioning buoys.

The example illustrates how the cylindrical buoys are advantageously mounted underneath of the cables so that they raise the line until the grips of the culture ropes are accessible outside the water.

To facilitate comprehension of the ideas presented here, a preferred embodiment of the present invention is given below, with reference to the accompanying illustrative drawings, which shall not limit by their selection or graphical representation the advantages and particular characteristics of this application.

The sole FIGURE shown in the illustration sheet shows a perspective view of one of the end parts of an improved submersible farm in accordance with this invention, which is represented schematically so as to provide a better view.

The FIGURE shows, suspended from the end float (1), a line of parallel cables (2 and 3) bearing culture ropes (4) which are conveniently separated from each other by means of positioners (5) while being supported by cylindrical buoys (6).

The end floats (1) and the corresponding cylindrical buoys (6) are joined by means of a pneumatic hose (7) which in turn is connected to an air intake (8) mounted on a beaconed surface buoy (9).

In the embodiment shown, the end float (1) is anchored to a concrete dead weight (10) or an anchor of similar type, to which it is connected by means of a tensioning cable (11) running on a pulley (12) attached to the dead weight and which connects it to a tensioning buoy (13) which is linked to the dead weight (10) by a fixed line (14) and to the surface buoy (9) by the anchor chain (15).

A cable (16) to which the pneumatic hose is attached joins the surface buoy (9) and the linking element (17), the latter also joining the end of the tensioning cable (11) and the bars (18) which aid in preventing the end floats (1) to capsize.

The invention claimed is:

1. A submersible shellfish farm comprising at least one line of cables bearing spaced culture ropes, said at least one line being suspended horizontally from two end floats which support said at least one line in association with intermediate support buoys positioned in relation to said at least one line of cables to maintain said at least one line of cables in a non-catenary manner, and said at least one line is further anchored by concrete dead weights positioned at each end of the at least one line, wherein the at least one line of cables is submersible and is elevated from a sea floor while guided by vertical movement of the two end floats when the two end floats are submerged, said two end floats being submerged or raised based on inner volume of said floats being variable by filling or draining of said inner volume of water or air and said end floats being connected to a surface buoy including an air intake valve, and said two end floats are connected to the concrete dead weights by an anchoring system which is constructed and arranged to create a vertical thrust on said at least one line of cables to tension and maintain tension on the at least one line of cables.

2. A submersible shellfish farm in accordance with claim 1, wherein said anchoring system comprises at least one end buoy submerged and arranged so as to use uplift thrust of said end buoy to pull at each of said end floats to which said end floats are respectively connected by means of tensioning cables and pulleys fixed to said concrete dead weights.

* * * * *